Nov. 18, 1969 — J. KOSAR — 3,479,072
POSITIVE LOCKING, NONMARRING SET SCREW
Filed June 20, 1966
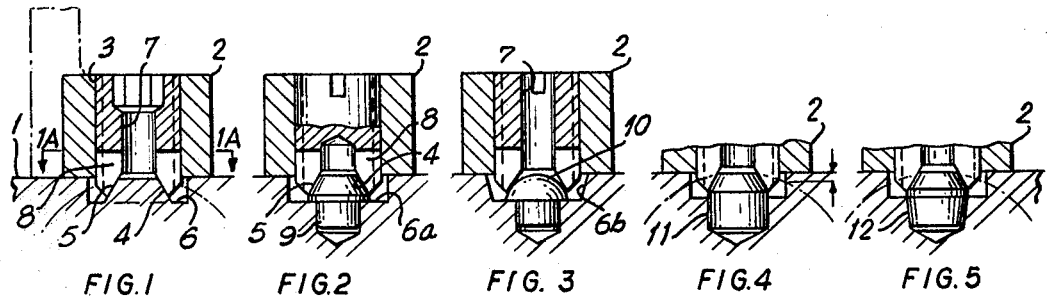
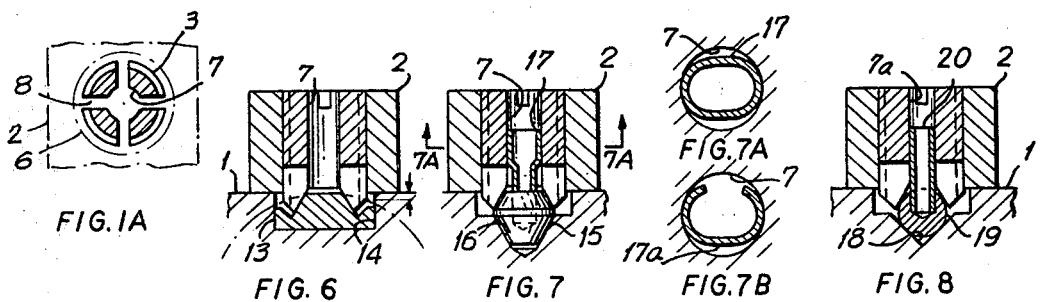
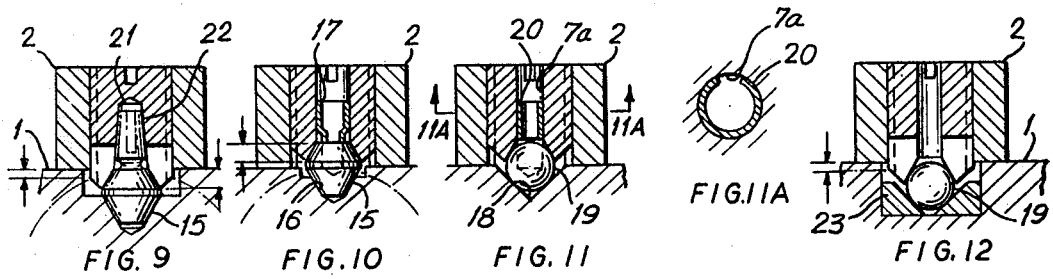
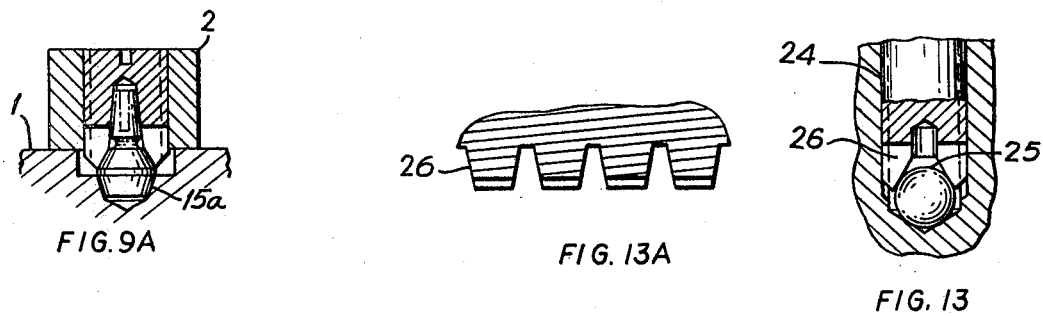
INVENTOR.
JOHN KOSAR

United States Patent Office 3,479,072
Patented Nov. 18, 1969

3,479,072
POSITIVE LOCKING, NONMARRING SET SCREW
John Kosar, % Anchor Engineering Co., 29—09 Bridge
Plaza N., Long Island City, N.Y. 11101
Continuation-in-part of applications Ser. No. 259,454,
Feb. 18, 1963, and Ser. No. 860,816, Dec. 21, 1959.
This application June 20, 1966, Ser. No. 558,929
Int. Cl. F16d *1/06;* B60b *27/06;* F16c *3/10*
U.S. Cl. 287—52.08                                                9 Claims

ABSTRACT OF THE DISCLOSURE

Applicant's set screw is non-marring because it generally does not make contact with the peripheral surface of a shaft, and it is positive locking because it indirectly locks the collar to the shaft in a positive manner, i.e., without play or backlash. The shaft generally is provided with a bored radial recess for permitting the end of screw to enter it an amount sufficient for allowing a full thread engagement at the I.D. of collar without contacting the diameter and bottom of the recess. The bottom of recess is generally provided with a central hole for a press-fit or wedging engagement of one end of a locking pin whose other end is usually made conical for engagement of a conical cavity provided in screw end. Tightening of screw locks the pin to the screw or to both the shaft and the screw.

---

This application is a continuation-in-part application Ser. No. 259,454 filed Feb. 18, 1963, and also application Ser. No. 860,816, filed Dec. 21, 1959 and both now abandoned.

A set screw is usually in threaded engagement with the wall of a collar or hub surrounding a shaft, and its purpose is to lock the collar or hub to the shaft or prevent movement of the collar relative to the shaft. The concealed or inner end of a standard set screw may make contact with the periphery of the shaft or bite into the shaft surface, or enter a recess provided in shaft. Set screws are also used on door knobs, faucet knobs, valve knobs, machine handles, hand wheels, etc.

There are (5) standard point set screws in use, namely the cup point, the flat point, the cone point, the oval point, and the dog point.

The most commonly used is the cup point set screw, and its cup point is intended to bite into the periphery of a soft shaft thereby causing burrs or a swelling of the shaft surface but which swelling hinders the removal of the collar, while on a hardened shaft, the cup point makes only a 2-point contact with the shaft surface which obviously cannot be relied on to permanently lock a collar to a shaft.

The flat point is intended to press upon the shaft surface but it can only make a short axial line contact with either a soft or hardened shaft surface, which again cannot be relied on to lock a collar to a shaft, since its frictional contact with the shaft surface allows a collar to be forcibly moved in both circular and axial direction.

The cone point is intended to enter a conical recess provided in shaft. This may seem satisfactory wtih a hardened shaft except that it cannot dilate the concealed screw end to also lock with its mating thread in collar, while in a soft shaft the conical recess will soon wear into an obling recess which, in addition, develops burrs on the shaft surface thereby hindering the removal of the collar or gear, etc.

The oval point is intended to enter a shallow conical drilled recess provided in shaft. This drilled recess may appear to be satisfactory in a hardened shaft except that it cannot dilate the screw-end for a simultaneous locking action with the mating thread in collar, while in a soft shaft the drilled recess will soon wear into an oval recess.

The dog point is intended to press upon the bottom of a drilled hole provided in a shaft. However, the diametrical tolerance of a cylindrical dog point is substantial, so that the resultant play cannot provide a locking action without backlash, while in a soft shaft the drilled hole will soon wear into an oval hole resulting in burr formations on the shaft surface.

It can be seen that none of the (5) standard point set screws are satisfactory or meet all requirements, in that:

(1) None have means to dilate the screw ends in order to prevent loosening of the screws thru elimination of the play between the mating threads.

(2) None are satisfactory for both soft and hardened shafts.

(3) All develop burrs on the surface of soft shafts.

(4) All of the points engaging a recess in a soft shaft tend to wear the recess into an oval outline.

(5) All fail to engage the thread at the I.D. of a collar, where it is essential for providing a rigid assembly of collar and shaft.

It is, therefore, an object of my invention to positively and rigidly lock a collar to a shaft, by providing a locking element situated centrally of a recess within the periphery of the shaft, and provide the shaft-surrounding the collar-wall with a set screw which inner or concealed end is provided with a conical cavity for overlapping and wedging locking engagement with said locking element thereby to cause dilation of the inner screw end for a simultaneous binding locking action with the mating thread in collar upon threadedly urging the set screw toward said locking element.

Another object of my invention is to provide around said locking element a bored recess in shaft, so as to allow the inner screw end to enter said recess and permit a full or nearly full engagement of the thread at the I.D. of collar to thereby provide the optimum of rigidity for a collar and shaft assembly.

Another object of my invention is to provide a locking element which may be integral with the shaft, be press-fitted or pressed into a cylindrical or tapered hole provided in shaft, be seated into a conical recess provided in shaft, be seated at the conical bottom of a drilled hole for a stud, etc., be a part of a hardened insert press-fitted into a recess provided in shaft or a plate, or be seated within a recess of a hardened insert press-fitted into a recess provided in shaft, plate, etc.

Another object of my invention is to provide a locking element in which the portion which is press-fitted into a hole in shaft or being in contact with the shaft, is provided with serrations for locking the element against rotation relative to the shaft. The same applies to the inserts press-fitted into the recess in shaft or plate.

A further object of my invention is to provide a locking element in which the portion contacted by the cavity in screw-end may be conical, or be the beveled edge of a cylindrical portion, or be spherical, or tapered.

Another object of my invention is to provide a set screw (or locking screw) which may be wholly tubular or partly tubular or recessed from the inner or cavity-end and both styles may be with or without axial slits extending a limited distance from the inner end, or the inner end of screw may be interruptedly recessed resulting in tooth-like formations. All three styles serve to facilitate dilation of the inner screw end by said locking element in shaft.

Another object of my invention is to provide a locking set screw wherein its inside diameter of a wholly or partly tubular surface is utilized to frictionally retain a solid or a tubular, a tubular and partly split, a rolled or coiled pin, in which its exposed end supports the locking element fixed thereto or integral therewith. The split, rolled or coiled pins are resiliently retained while the solid and tubular pins are to have either axial serrations or axial and annular serrations for frictional retainment by the I.D. surface of a tubular or hollow screw.

A still further object of my invention is to provide a locking screw with a tapered socket for seizing or frictional retainment of a shank which exposed end is either integral with or fixed to the locking element.

Another object of my invention is to provide the periphery of the shaft either with a bored recess, a flat recess, or an annular recess, in each of which one or more holes may be provided for insertion of a locking element.

A further object is to provide a tubular or partly tubular set screw wherein its hole surface is utilized for the insertion and retainment of a tubular or solid, or a roll or coiled pin, which exposed end is attached to the top of locking element for supporting it, while its inserted portion of either style may be slightly flattened into an oval shape for accommodating a hole diameter in screw which is larger than that of the pin, and either style screw may be provided with limited axial slits arranged diametrically opposite or crosswise for facilitating dilation of screw end.

Still another object is the provision for a collar and shaft assembly wherein the collar is locked to the shaft at a selected position relative thereof so that an exact repositioning of collar is possible after each removal.

Other objects and a fuller understanding of the invention may be had by referring to the following description and claims taken in conjunction with the acompanying drawings, in which:

FIG. 1 is a sectional side view of one form of my invention and FIG. 1A is a sectional plan view at 1A—1A of FIG. 1.

FIGS. 2–7 are sectional side views of additional forms of my invention while FIG 7A is a sectional plan view at 7A—7A of FIG. 7, and FIG. 7B is a modification of FIG. 7A.

FIGS. 8–11 are sectional side views of other forms of my invention while FIG. 11A is a fractional sectional plan view at 11A—11A of FIG. 11.

FIG. 12 is a sectional side view of a modified form of my invention.

FIG. 13 is a sectional side view of another application of my invention, and FIG. 13A is a developed elevation of the screw or stud end in FIG. 13.

Brief summary of invention

The purpose of applicant's set screw and its locking element is to withstand not only axial thrust that may be exerted against a collar on a shaft but rather to make the hub of a gear etc. withstand both axial thrust and torque. Since the shearing tendency is at the I.D. of a hub, it is important that a playless rigidity exists at that region and applicant has solved this problem thru the extension of the screw into a bored recess of shaft, as well as the conical or playless engagement of the locking element in both the screw and shaft including the dilation of the former. It is the in all direction rigid locking of the hub of a gear which makes applicant's set screw ideal for replacing expensive keyways and keys which only lock in circular direction and for that reason a set screw over the key must in addition be provided in hub for locking a gear also in axial direction.

Following is a detailed description of the drawing in which similar reference characters refer to similar parts throughout the several views.

In FIG. 1–1A, the shaft 1 is surrounded by a collar- or hub-wall 2 having a threaded radial hole for threaded engagement by a set screw 3 having at its inner end a conical cavity 4. The shaft is provided with an integral conical locking element 5 for wedging engagement with said conical cavity. The locking element has a flat top which is flush with the periphery of shaft and projects from the bottom of a bored annular recess 6 provided in shaft. Said bored recess extends around the locking element and permits the end of the set screw to enter a sufficient amount for allowing a full thread engagement with its mating thread at the I.D. of collar wall. The conical wedging of the locking element with said cavity serves to dilate the screw end to simultaneously cause a binding locking action with its mating thread resulting in a rigid collar and shaft assembly without backlash. The screw may be tubular as shown at 7 and its concealed or inner end portion may be provided with one diametrical or a pair of crosswise arranged radial slits 8 for facilitating said dilation. The exposed end of screw may have either a hex socket as shown or a driver slot for wrenching. The integral locking element in FIG. 1 is primarily suitable for hardened shafts.

FIG. 2 is similar to FIG. 1 except that the periphery of shaft is provided with a bored flat bottom recess 6A having a central hole for the insertion of the shank of a shouldered pin 9 having a conical head portion or locking element 5 in wedging engagement with cavity 4 of screw end. The screw may have a drilled recess as shown or be tubular or solid and with or without the radial slits shown. The flat top of conical head portion 5 is shown flush with the O.D. of shaft 1.

FIG. 3 is similar to FIG. 2 except that the conical locking head is replaced by a spherical head 10, and that the recess 6b is similar to recess 6a except being conical. Such a conical recess may be incorporated in all applicable figures.

FIG. 4 is similar to FIG. 2 except that its shouldered locking pin is replaced by a straight pin 11 pressed into its hole in shaft and backed by the bottom of its hole.

FIG. 5 is similar to FIG. 4 except that the press-fitted portion 12 of locking pin is tapered resulting in a seizing engagement with its hole.

FIG. 6 is similar to FIG. 1 except that the locking cone portion is integral with a hardened insert or disk 13 pressed into a recess 14 provided in shaft.

FIGS. 7–7B are similar to FIG. 5 except that the lower conical portion 15 of locking pin is removably seated within a 60° conical socket 16 provided in shaft while a tubular pin has one end attached to the flat top of locking element and the upper end portion 17 being inserted into the I.D. of tubular screw. The upper portion 17 of tubular pin is somewhat flattened so as to be circularly oblong for a resilient frictional retainment by the hole surface of screw to thereby keep the locking element retained by the screw for shipment and handling as a unit. FIG. 7B is similar to FIG. 7A except that the wall of tubular pin 17A is lengthwise slitted to thereby provide a greater resiliency. Both FIGS. 7A and 7B are exaggerated for better illustration. The tubular pin in FIG. 7 may be inserted into a hole provided in top of locking element as indicated, or its end may be soldered to top of locking element.

FIG. 8 is similar to FIG. 7 except that the socket in shaft is replaced by a conical recess 18 for seating a ball 19 provided at its top with a hole for frictional insertion of a tubular split pin which projecting portion 20 is in resilient frictional engagement with the I.D. of the tubular screw to thereby retain the ball. The split pin may instead be soldered to the top of ball 19.

FIG. 9 is similar to FIG. 7 except that the screw is provided with a tapered socket 21 for a frictional and a slight seizing retainment of a corresponding pin 22 which lower end may be integral with the top of locking element as shown, or be inserted into a hole which may be provided in top of locking element. The tapered pin may be lengthwise slitted as indicated in phantom. In FIG. 9A the removable plug 15a is shown with a 34° angle in a like socket.

FIG. 10 is similar to FIG. 7 except that no bored recess is provided in shaft for the screw end to enter, and only a conical socket 16 is provided in shaft for insertion of a corresponding cone portion 15 of the locking pin. The screw may be without slits as shown or be provided with slits. (See summary.)

FIG. 11 is similar to FIG. 8 except that no bored recess is provided in shaft for the screw end to enter, and only a conical recess 18 is provided in shaft for seating a ball 19 having a hole for insertion of one end of a tubular split pin as shown in FIG. 11A while the projecting end portion of tubular pin is frictionally retained by the hole surface of screw. The screw may be without slits as shown or be provided with slits.

FIG. 12 is similar to FIG. 8 except that the ball 19 is freely seated within a conical recess of a hardened insert or disk 23 pressed into a bored recess provided in shaft. One end of a tubular pin may be attached to the ball while the exposed portion of pin may be frictionally retained by the hole surface of screw similar to FIG. 8. The screw may be tubular as shown, or be solid, and be with slits as shown or be without slits.

FIGS. 13-13A illustrate the lower end portion of a stud 24 in threaded engagement with a hole in a body or block. The inner end of stud is provided with a conical cavity for wedging contact with a ball 25 seated at the drilled or conical bottom of stud hole. The conical cavity is provided with a drilled recess similar to that in FIG. 2, and the screw-end may have four toothed formations 26 to facilitate its dilation by the ball, or the toothed formation may be replaced by radial slits similar to that in FIG. 1A.

In FIGS. 1-6, 12 and 13, the locking element is either integral with the shaft as in FIG. 1, or pressed into a recess provided in shaft as in FIGS. 2-6, or seated in a recess within an insert pressed into a recess provided in shaft as in FIG. 12, or seated at the bottom of a tapped hole as in FIG. 13; while in FIGS. 7-11, the locking element is seated within a conical recess in shaft but removably retained by a stem within a thru hole, a drilled recess or socket provided in set screw. In FIGS. 1-6 and 12 the top of locking element is flush with the periphery of shaft. The same is true with FIGS. 7-9 except that a retaining pin or stem projects therefrom. All screws shown with slits may be without slits, and all locking plugs or balls removably seated within a recess or socket provided in shaft, may be frictionally retained by a tubular or solid shank in frictional engagement with a hole surface in screw.

The included angle of the conical locking element in shaft may vary between 30° and 90°, however, a 30° angle is preferable.

The phantom circular shaft outline in FIG. 6 was drawn to indicate its intersection of the peripheral edge of screw thread at the 45° bevel defining the end of screw thread which also is the innermost thread engagement of collar and screw.

The bored recess 6 in FIG. 1 and 6a in FIG. 2 and others, may instead be a conical recess to avoid sharp edges formed with the circular outline of shaft.

The straight and split tubular spring pin in FIG. 11A may also be employed in FIGS. 7, 8, 10 and 12 except that in FIGS. 7 and 10 the diameter of hole in screw would have to be reduced to avoid flattening the spring pin for a larger hole as shown in relation to the diameter of the flat top of locking element. The split pin in FIG. 11A may instead be an overlapping coil pin.

In FIGS. 9 and 9A the dilation of screw-end is only caused by the locking element since the frictional engagement of the tapered shank above is limited by the locking element.

In FIG. 10, the periphery of shaft is provided with a shallow bored recess around the mouth of its socket in order to allow for burr formations without the burrs interfering with the removal of the collar.

In FIGS. 2-5 and 7-12, the bored circular recess 6a in FIG. 2, etc., may instead be a lengthwise recess in shaft, and the bottom of such a lengthwise recess be provided with two or more holes for press-fitting the shank of pins as in FIGS. 2-5; or two or more conical sockets provided for seating a conical shank portion or a ball as in FIGS. 7-9; while in FIGS. 6 and 12 only a lengthwise flat bottom recess would be required for a pressed-in bar having either two or more locking elements projecting upwardly therefrom as in FIG. 6, or have two or more conical holes or sockets for seating a ball as in FIG. 12, or as in FIG. 6, a bar with one projecting locking element or as in FIG. 12 a conical hole for a ball may be slideable for a selected position within its lengthwise recess in shaft; whereas in FIGS. 10 and 11 two or more conical sockets without the said lengthwise recess would be required lengthwise of shaft except that in FIG. 10, a lengthwise shallow recess at both sides of the sockets would be required for allowing room for burr formation within the periphery of shaft.

Gears, sprockets, pulleys, etc., with a long hub, may have one or more of my set screws and locking elements placed in lengthwise direction of shaft, or one or more of my set screws and locking elements placed around a short hub. The locking element with the tapering shank in FIG. 5 would provide for utmost rigidity. The same is true with the hardened disk and its integral locking element in FIG. 6 and which disk is especially suited because of the shallow recess required in shaft for press-fitting the disk.

Therefore, the features in FIGS. 5 and 6 are excellently suited for replacing the extensive milling of key slots in both the shaft and hub for fitting a key. A key is normally press-fitted into the milled slot in a shaft and slip-fitted into the milled slot in a hub of a gear, etc. The slip-fitting of a key in hub is required for ease of removal of the gear from the shaft. This, however, leaves a little play which multiplies from the center of the shaft to the pitch diameter of a gear, etc., resulting in a greater or smaller backlash at the gear teeth. Such a backlash hastens the wear of the gear teeth and which wear increases the backlash. An increase in backlash can be very harmful if the gear teeth are related to say a notching operation, etc., which must be performed at each revolution of the gear.

Another disadvantage of keys and keyways is the fact that the portion of a key engaging the key slot in a hub must necessarily project from the periphery of the shaft, therefore, a part on a shaft positioned on either side of a key cannot be removed past the key, and one cannot remove the key without reducing its effectiveness.

A further disadvantage of keys and keyways is that a key only locks a part in rotary direction while any one of my set screws in conjunction with the locking element locks a gear in both rotary and axial directions and this without backlash.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereafter claimed.

What is claimed is:

1. In a collar and shaft assembly, said collar having a threaded radial bore extending from the inner to the outer periphery of the collar, a screw element in threaded engagement with said bore in said collar and having generally a conical cavity in its inner end, a radial recess formed in the outer periphery of said shaft, a centrally located hole in the bottom of said recess, the minimum spacing apart of the wall portions of said recess being greater than the diameter of said threaded bore, and the depth of said recess being at least sufficient to permit said screw element when in its normal assembled position to have a portion of its threaded periphery extending into said recess but free of engagement with the wall of said recess, a locking element rigidly positioned in said hole in said recess, said locking element comprising a locking portion and a seating portion, the locking portion extending outwarding in said recess but confined within the periphery of the shaft for wedging engagement in said cavity, and the seating portion being inserted into said hole to thereby support said locking portion, said cavity in said screw element and said locking portion being so proportioned that upon interengagement thereof the inner end of said screw element is prevented from engaging the bottom of said recess, and that portion of the threaded periphery of said screw element is radially expanded to cause a thread lock with the threads of said bore without burring or galling of said shaft.

2. The assembly as in claim 1, wherein at least the inner end-portion of said screw element is made tubular so as to intersect with said conical cavity to thereby facilitate the radial expansion of said end-portion by said locking portion and wherein the locking portion is substantially frusto-conical for engagement in said cavity.

3. The assembly as in claim 2, wherein the tubular end-portion of said screw element is diametrically slitted to further facilitate its radial expansion.

4. The assembly as in claim 1, wherein said locking portion is provided with a plug type seating portion for press fit engagement with said hole.

5. The assembly as in claim 1, wherein the bottom of said recess is provided with a centrally located frusto-conical hole having an included angle greater than 16°, and said locking portion being provided with a corresponding frusto-conical plug type seating engagement portion for self-release engagement of said hole.

6. The assembly as in claim 5, wherein at least the inner end-portion of said screw element is provided with a concentric hole which intersects said conical cavity, and wherein said locking portion being made frusto-conical and having a flat top provided with a resilent tubular extension for frictional engagement of said concentric hole to thereby retain said locking element.

7. The assembly as in claim 5, wherein the top of said frusto-conical locking portion is provided with a tapered shank extension having a diametrical slit, and said screw element being provided with a corresponding hole for resilient engagement of said shank extension to thereby releasingly retain said locking portion.

8. The assembly as in claim 1, wherein said locking portion is provided with a seating portion in the form of a pin forming a shoulder with the locking portion, said pin being in press-fit engagement with said hole while said shoulder serves to limit its insertion into its hole.

9. The assembly as in claim 1, wherein the diameter of said centrically located hole in bottom of said recess is enlarged to at least the proximity of said minimum spacing apart of the wall of said recess for press-fit engagement of a correspondingly enlarged diameter of said seating portion.

References Cited

UNITED STATES PATENTS

| 918,526 | 4/1909 | Funk. | |
|---|---|---|---|
| 1,372,291 | 3/1921 | Jacobs. | |
| 1,438,648 | 12/1922 | Jacobs. | |
| 2,479,075 | 8/1949 | Martin | 151—31 |
| 2,618,495 | 11/1952 | Maurey | 287—52.08 |
| 2,770,276 | 11/1956 | Broder | 151—31 |
| 291,945 | 1/1884 | Schwarzwalder | 151—31 |
| 936,549 | 10/1909 | Lundholm | 287—52.08 |
| 2,178,160 | 10/1939 | Berry | 151—31 |

FOREIGN PATENTS

| 12,650 | 4/1910 | France. |
|---|---|---|
| 110,917 | 11/1917 | Great Britain. |
| 411,847 | 6/1934 | Great Britain. |
| 334,413 | 1/1959 | Switzerland. |

DAVID J. WILLIAMOWSKY, Primary Examiner

A. V. KUNDRAT, Assistant Examiner

U.S. Cl. X.R.

85—1; 151—31